United States Patent
Sheu

(10) Patent No.: US 9,148,220 B2
(45) Date of Patent: Sep. 29, 2015

(54) OPTICAL SIGNAL TRANSMISSION DEVICE APPLYING ALTERNATIVE AND SELECTABLE TRANSMISSION PATHS

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 13/966,245

(22) Filed: Aug. 13, 2013

(65) Prior Publication Data
US 2014/0355999 A1 Dec. 4, 2014

(30) Foreign Application Priority Data
May 29, 2013 (TW) .............................. 102118881 A

(51) Int. Cl.
| | |
|---|---|
| H04J 14/00 | (2006.01) |
| H04B 10/00 | (2013.01) |
| H04Q 11/00 | (2006.01) |
| H04B 10/25 | (2013.01) |
| G02B 6/43 | (2006.01) |
| G02B 6/35 | (2006.01) |

(52) U.S. Cl.
CPC .............. *H04B 10/12* (2013.01); *G02B 6/3512* (2013.01); *G02B 6/43* (2013.01); *H04B 10/25* (2013.01); *H04Q 11/0005* (2013.01); *G02B 6/3546* (2013.01); *G02B 6/3596* (2013.01); *G02B 6/3598* (2013.01); *H04J 2203/0005* (2013.01); *H04J 2203/0012* (2013.01); *H04Q 2011/0052* (2013.01)

(58) Field of Classification Search
CPC .............. H04Q 11/0005; H04Q 2011/0052; H04J 2203/0005; H04J 2203/0012; H04B 10/25
See application file for complete search history.

(56) References Cited

U.S. PATENT DOCUMENTS

| | | | | |
|---|---|---|---|---|
| 5,544,268 | A | * | 8/1996 | Bischel et al. ...................... 385/4 |
| 6,049,641 | A | * | 4/2000 | Deacon et al. ..................... 385/15 |
| 6,094,293 | A | * | 7/2000 | Yokoyama et al. ............ 359/280 |
| 6,493,479 | B1 | * | 12/2002 | Briggs ............................. 385/17 |
| 6,747,793 | B1 | * | 6/2004 | Flanders ........................ 359/344 |
| 6,825,967 | B1 | * | 11/2004 | Chong et al. .................... 359/290 |
| 7,209,607 | B2 | * | 4/2007 | Martinelli et al. ............... 385/17 |
| 2002/0110328 | A1 | * | 8/2002 | Bischel et al. .................. 385/49 |
| 2003/0007234 | A1 | * | 1/2003 | Holmes ......................... 359/290 |
| 2003/0063363 | A1 | * | 4/2003 | Romanovsky ................ 359/245 |
| 2003/0210870 | A1 | * | 11/2003 | Graves .......................... 385/71 |
| 2004/0017964 | A1 | * | 1/2004 | Takeyama et al. .............. 385/18 |
| 2012/0033973 | A1 | * | 2/2012 | Trojer et al. .................... 398/72 |

* cited by examiner

*Primary Examiner* — Li Liu
(74) *Attorney, Agent, or Firm* — Novak Druce Connolly Bove + Quigg LLP

(57) ABSTRACT

An optical signal transmission device is used for transmitting optical light rays from a number of light emitters to a number of light receivers, and includes a substrate, a number of first optical waveguide elements, a number of second optical waveguide elements, a number of reflectors, and an integrated circuit. The substrate has a first side surface for positioning the light emitters, and a second side surface for positioning the light receivers. The light emitters and the light receivers are corresponding to the first optical waveguide elements. The second optical waveguide elements intersect with the first optical waveguide elements to form a number of hollow junctions for receiving the reflectors. Each reflector can rotate around a rotating shaft thereof in the corresponding hollow junction to change the optical transmission path of light rays from the light emitters. The integrated circuit controls rotating angles of the reflectors.

10 Claims, 2 Drawing Sheets

OPTICAL SIGNAL TRANSMISSION DEVICE APPLYING ALTERNATIVE AND SELECTABLE TRANSMISSION PATHS

BACKGROUND

1. Technical Field

The present disclosure relates to an optical signal transmission device.

2. Description of Related Art

Currently, optical signals are transmitted through optical fibers. However, the optical transmitting path of light rays is only within each optical fiber. Once the optical transmitting path is fixed by the fibers, it is difficult to be changed.

Therefore, it is desirable to provide an optical signal transmission device that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
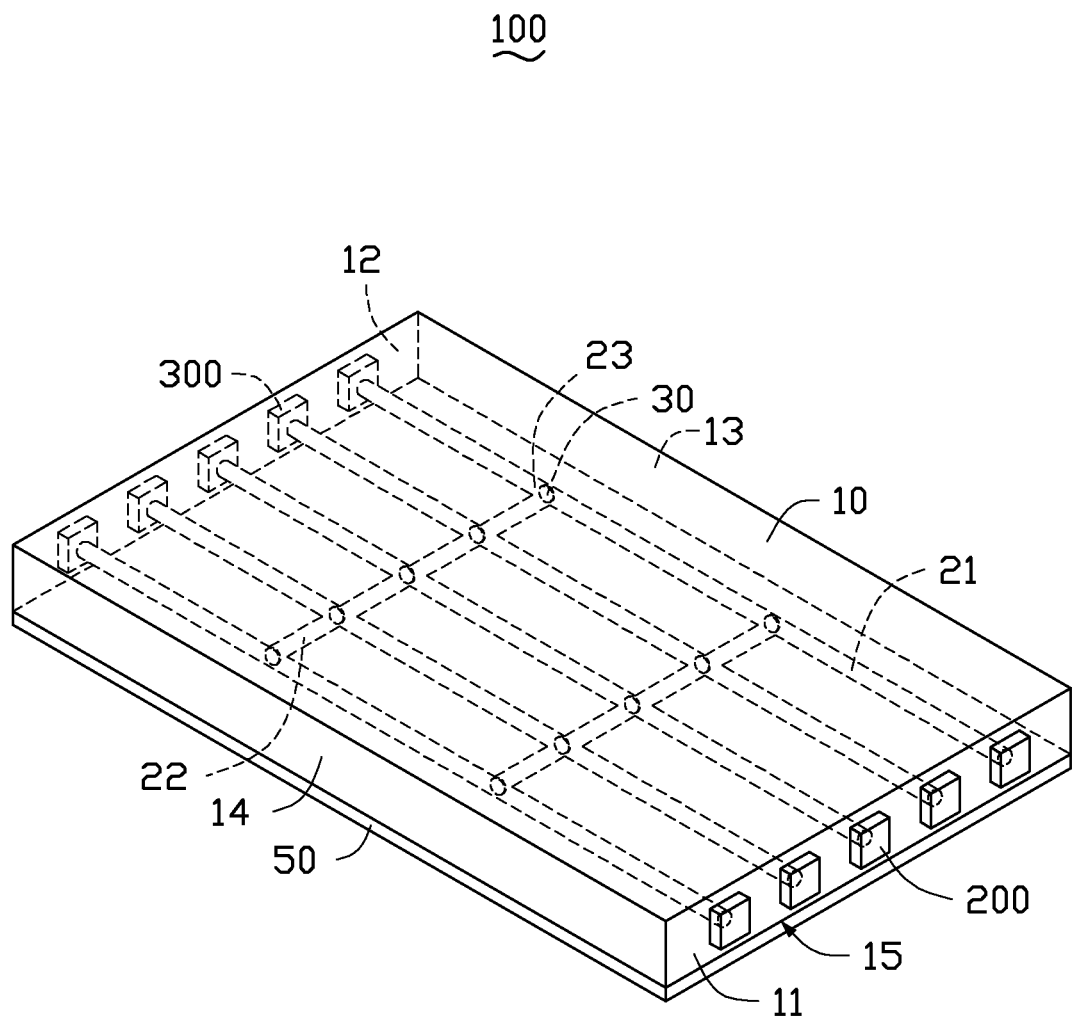
FIG. 1 is a schematic view of an optical signal transmission device, according to an exemplary embodiment.
Figure 2:
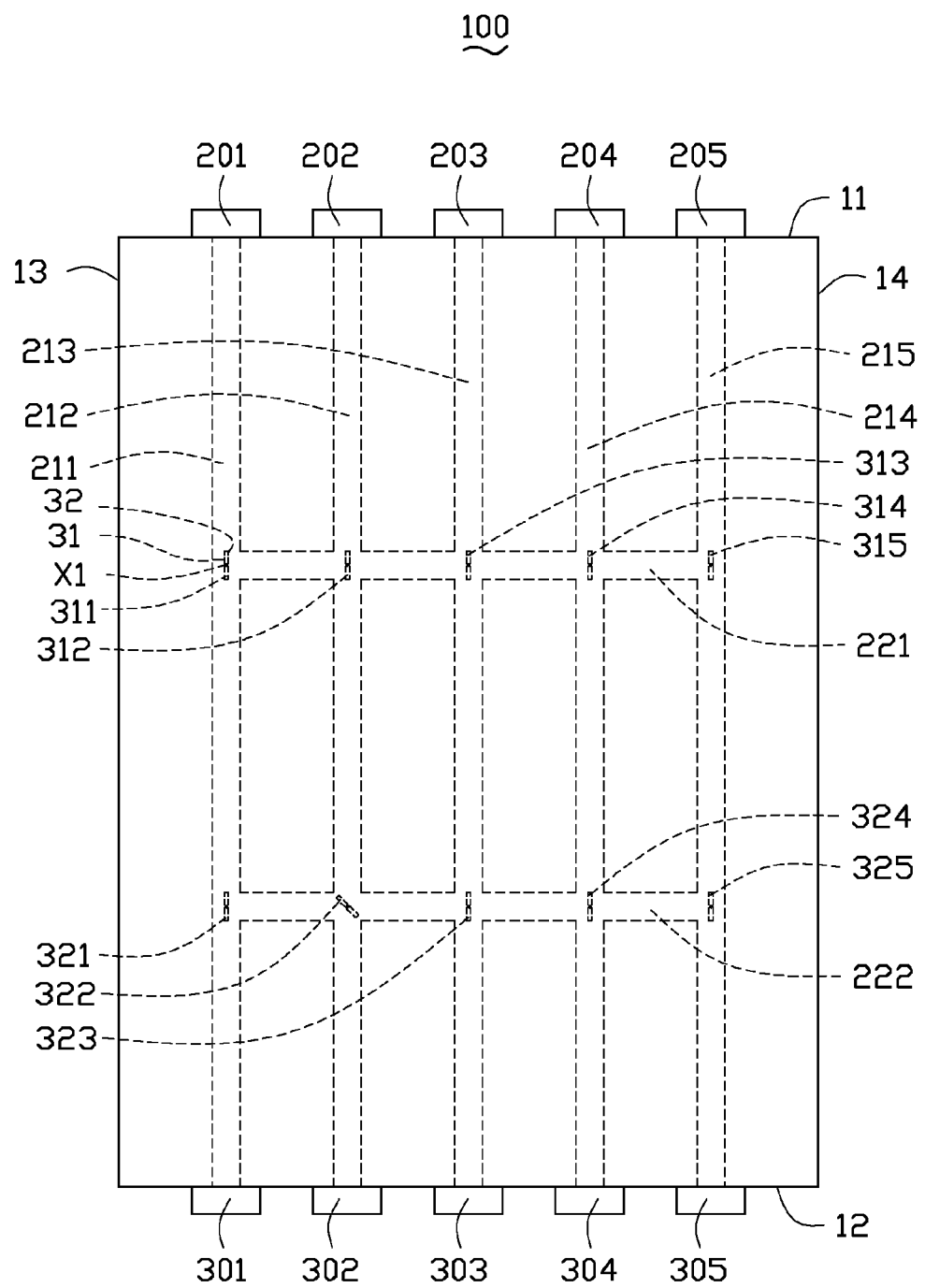
FIG. 2 is a schematic view showing the optical signal transmission device of FIG. 1 in a working state.

FIG. 1 and FIG. 2 illustrate an optical signal transmission device 100 in accordance with an exemplary embodiment. The optical signal transmission device 100 is used for transmitting light rays from a number of light emitters 200 to a number of light receivers 300. In this embodiment, each of the light emitters 200 includes a laser diode or a light emitting diode, and each of the light receivers 300 includes a solar panel or a photo diode.

The optical signal transmission device 100 includes a substrate 10, a number of first optical waveguide elements 21, a number of second optical waveguide elements 22, a number of reflectors 30, and an integrated circuit 50.

The substrate 10 includes a first side surface 11, a second side surface 12, a third side surface 13, a fourth side surface 14, and a bottom surface 15. The second side surface 12 is opposite and parallel to the first side surface 11. The fourth side surface 14 is opposite and parallel to the third side surface 13. Both of the third surface 13 and the fourth surface 14 are connected to the first side surface 11 and the second side surface 12. The bottom surface 15 is perpendicularly connected to the first side surface 11, the second side surface 12, the third side surface 13, and the fourth side surface 14.

The first optical waveguide elements 21 and the second optical waveguide elements 22 are formed in the substrate 10, and are positioned at a same height within the substrate 10, all of the first optical waveguide elements 21 and the second optical waveguide elements 22 are parallel to the bottom surface 15. The first optical waveguide elements 21 and the second optical waveguide elements 22 are used for transmitting the light rays from the light emitters 200.

The first optical waveguide elements 21 are substantially parallel with each other, and extend between the first side surface 11 and the second side surface 12. The light emitters 200 are positioned on the first side surface 11. The number of the light emitters 200 are corresponding to the number of the first optical waveguide elements 21. Each of the light emitters 200 faces and is aligned with the respective first optical waveguide element 21. The light receivers 300 are positioned on the second side surface 12, and are corresponding to the first optical waveguide elements 21. Each of the light receivers 300 faces and is aligned with the respective first optical waveguide element 21. Therefore, the light emitter 200 and the corresponding light receiver 300 are positioned on two opposite ends of the corresponding first optical waveguide element 21. The first optical waveguide elements 21, the second optical waveguide elements 32, the light emitters 200, and the light receivers 300 are at a same height with respect to the bottom surface 15.

The shapes of the second optical waveguide elements 22 are substantially the same as the shapes of the first optical waveguide elements 21, and the second optical waveguide elements 22 extend between the third side surface 13 and the fourth surface 14. The second optical waveguide elements 22 are substantially parallel with each other, and are substantially perpendicular to the first optical waveguide elements 21. The second optical waveguide elements 22 interconnect with the first optical waveguide elements 21 to form a number of hollow junctions 23 between the first optical waveguide elements 21 and the second optical waveguide elements 22. In this embodiment, the first optical waveguide elements 21 and the second optical waveguide elements 22 are substantially cylindrical, and a diameter of the first optical waveguide element 21 is substantially equal to a diameter of the second optical waveguide element 22.

Each hollow junction 23 houses one reflector 30. Each reflector 30 has a first reflecting surface 31 and a parallel second reflecting surface 32 opposite to the first reflecting surface 31. The shape and the area of the first reflecting surface 31 are substantially the same as the shape and the area of the second reflecting surface 32 respectively. In this embodiment, the first reflecting surface 31 and the second reflecting surface 32 are substantially circular.

Each reflector 30 can rotate in the corresponding hollow junction 23 around a rotating shaft X1 which is perpendicular to bottom surface 15, and the rotating shaft X1 of the reflector 30 extends between a central portion of the hollow junction 23. The reflectors 30 have four working states or orientations: (1) the first working state is when the first reflecting surface 31 is substantially perpendicular to the lengthwise direction of the first optical waveguide element 21; (2) the second working state is when the first reflecting surface 31 is substantially perpendicular to the lengthwise direction of the second optical waveguide element 22; (3) the third working state is when the first reflecting surface 31 faces the light emitter 200, and an included angle between the first reflecting surface 31 and the lengthwise direction of the first optical waveguide element 21 is about 45 degrees; (4) the fourth working state is when the first reflecting surface 31 faces the light receiver 300, and an included angle between the first reflecting surface 31 and the lengthwise direction of the first optical waveguide element 21 is about 45 degrees. In this embodiment, the reflectors 30 are microelectromechanical system (MEMS) reflective devices.

The integrated circuit 50 is positioned on the bottom surface 15 of the substrate 10, and is used for controlling the rotating angle of the reflectors 30.

For convenience in illustrating a working process of the optical signal transmission device 100, along the direction from the third side surface 13 to the fourth side surface 14, the light emitters 200 are labeled as 201, 202, 203, 204, 205, and the light receivers 300 are labeled as 301, 302, 303, 304, 305.

The reflectors 30 in a line adjacent to the light emitter 200 are labeled as 311, 312, 313, 314, 315, the reflectors 31 in a line adjacent to the light receiver 300 are labeled as 321, 322, 323, 324, 325, and the first optical waveguide elements 21 are labeled as 211, 212, 213, 214, 215. Along a direction from the first side surface 21 to the second side surface 22, the second optical waveguide elements 22 are labeled as 221, 222.

If the light rays from the light emitters 201 need to be redirected to the light receivers 301, 302, the reflectors 311, 312, 321 are in the second working state, and the reflector 322 is in the fourth working state, and then the reflectors 311, 321 permit the light rays to pass in the first waveguide element 211. The reflector 312 blocks the light rays to transmit in the second waveguide element 221, and the reflector 322 reflects the light rays in the second waveguide element 222 into the first waveguide element 212. Because the light rays are totally reflected during in the first waveguide elements 31 and the second waveguide elements 32 during transmission, a portion of the light rays transmitted in the first waveguide element 211 are reflected into the second waveguide element 222 by an inner sidewall of the first waveguide element 211, and are then reflected by the reflector 322 to the first waveguide element 212, and finally arriving at the light receiver 302. The other portion of light rays transmitted in the first waveguide element 211 continues to be transmitted in the first waveguide element 211 to finally arrive at the light receiver 301.

By employing the optical signal transmission device 100, the transmitting path of the light rays from the light emitters 200 can be changed through rotating the reflectors 30 according to need.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical signal transmission device configured for transmitting light rays from a plurality of light emitters to a plurality of light receivers, the optical signal transmission device comprising:
    a substrate comprising a first side surface and a second side surface opposite to the first side surface;
    a plurality of first optical waveguide elements being substantially parallel with each other, and formed in the substrate;
    a plurality of second optical waveguide elements being substantially parallel with each other, and formed in the substrate, the second optical waveguide elements being substantially perpendicular to the first optical waveguide elements, the second optical waveguide elements intersected with the first optical waveguide elements, and thus forming a plurality of hollow junctions at cross portions of the first optical waveguide elements and the second optical waveguide elements to change the optical transmission path of light rays;
    a plurality of reflectors corresponding to the hollow junctions, each hollow junction housing one of the reflectors, the reflectors being capable of rotating around a rotating shaft thereof in the respective hollow junctions, each of the reflectors having a first reflecting surface and a second reflecting surface opposite to the first reflecting surface; and
    an integrated circuit configured for controlling rotating angles of the reflectors;
    wherein the first optical waveguide elements pass through the first side surface and the second side surface, the light emitters are positioned on the first side surface corresponding to the first optical waveguide elements, and the light receivers are positioned on the second side surface, and are corresponding to the first optical waveguide elements, each of the reflectors has four working states: the first working state is when the first reflecting surface is substantially perpendicular to the lengthwise direction of the first optical waveguide element, the second working state is when the first reflecting surface is substantially perpendicular to the lengthwise direction of the second optical waveguide element, the third working state is when the first reflecting surface faces the light emitters, and an included angle formed between the first reflecting surface and the lengthwise direction of the first optical waveguide element is about 45 degrees, and the fourth working state is when the first reflecting surface faces the light receivers, and an included angle formed between the first reflecting surface and the lengthwise direction of the first optical waveguide element is about 45 degrees.

2. The optical signal transmission device of claim 1, wherein the substrate further comprises a third side surface and a fourth side surface opposite to the third side surface, the second optical waveguide elements pass through the third side surface and the fourth side surface.

3. The optical signal transmission device of claim 2, wherein the substrate further comprises a bottom surface perpendicularly connected to the first side surface and the second side surface, the first waveguide elements, the second waveguide elements, the first optical waveguide elements, and the second optical waveguide elements are at a same height with respect to the bottom surface.

4. The optical signal transmission device of claim 1, wherein the shape of the first optical waveguide element is substantially the same as the shape of the second optical waveguide element.

5. The optical signal transmission device of claim 4, wherein the first waveguide elements and the second waveguide elements are substantially cylindrical, and a diameter of the first optical waveguide element is substantially equal to a diameter of the second optical waveguide element.

6. The optical signal transmission device of claim 1, wherein a central point of the hollow junction extends between the rotating shaft of the respective reflector, the shape of the first reflecting surface is substantially the same as the shape of the second reflecting surface, and the area of the first reflecting surface is substantially the same as the area of the second reflecting surface.

7. The optical signal transmission device of claim 6, wherein the first reflecting surface and the second reflecting surface are substantially circular.

8. The optical signal transmission device of claim 1, wherein the first side surface is substantially parallel with the second side surface.

9. The optical signal transmission device of claim 1, wherein the reflectors are microelectromechanical system.

10. The optical signal transmission device of claim 1, wherein each of the light emitters comprises a laser diode or a light emitting diode, each of the light receivers comprises a solar panel or a photo diode.

* * * * *